United States Patent
Koh

(10) Patent No.: US 7,013,121 B1
(45) Date of Patent: Mar. 14, 2006

(54) FREQUENCY CONVERSION CIRCUIT USING COMMON LOCAL SYNTHESIZER

(75) Inventor: Christopher T. Koh, South Deerfield, MA (US)

(73) Assignee: Telaxis Communications Corporation, South Deerfield, MA (US)

( * ) Notice: Subject to any disclaimer, the term of this patent is extended or adjusted under 35 U.S.C. 154(b) by 0 days.

(21) Appl. No.: 09/507,532

(22) Filed: Feb. 18, 2000

(51) Int. Cl.
*H04B 1/26* (2006.01)

(52) U.S. Cl. .................. 455/314; 455/209; 455/118; 455/76

(58) Field of Classification Search .............. 455/84, 455/83, 82, 76, 79, 86, 118, 127, 180.1, 129, 455/188.1, 180.2, 112, 113, 190.1, 314, 313, 455/323, 209
See application file for complete search history.

(56) References Cited

U.S. PATENT DOCUMENTS

| | | | |
|---|---|---|---|
| 5,392,008 A | 2/1995 | Wong | 333/21 R |
| 5,844,939 A * | 12/1998 | Scherer et al. | 375/219 |
| 5,881,369 A * | 3/1999 | Dean et al. | 455/78 |
| 5,924,021 A | 7/1999 | Paul et al. | 455/209 |
| 5,974,302 A * | 10/1999 | Adamiecki et al. | 455/84 |
| 6,041,219 A * | 3/2000 | Peterson | 455/81 |
| 6,226,499 B1 * | 5/2001 | Nakatani et al. | 455/78 |
| 6,308,050 B1 * | 10/2001 | Eklof | 455/76 |
| 6,438,358 B1 * | 8/2002 | Higuchi | 455/84 |
| 6,484,013 B1 * | 11/2002 | Ishii | 455/73 |

* cited by examiner

*Primary Examiner*—Nay Maung
*Assistant Examiner*—Tilahun Gesesse
(74) *Attorney, Agent, or Firm*—Hamilton, Brook, Smith & Reynolds, P.C.

(57) ABSTRACT

A radio for use in microwave datalink applications in which a common local oscillator is used for both a final radio frequency (RF) up-converter stage and an initial RF down converter stage. The frequency of the common local oscillator corresponds to an integer multiple of a local oscillator needed for an earlier up-converter or later down converter stage. The circuit can be used to provide a radio frequency carrier in a 30 GHz band using Coaxial Resonator Oscillators (CRO's) that lend themselves to a planar microstrip circuit implementation.

13 Claims, 2 Drawing Sheets

FREQUENCY CONVERSION CIRCUIT USING COMMON LOCAL SYNTHESIZER

BACKGROUND OF THE INVENTION

A number of access technologies are presently available for wireless data connectivity. These wireless access products include Wireless Local Loop (WLL), Fixed Wireless Access (FWA), Cellular Packet Data (CDPD), Wireless Local Area Network (WLAN), narrow aperture satellite technologies, Local Multipoint Distribution Service (LMDS), and Multipoint Distribution Service (MMDS). A range of data transfer speeds are supported with these technologies, including multiple or fractional T1/E1 type, asynchronous transfer mode (ATM), digital video, plain old telephone service (POTS), and other types of digital signaling connections.

Of chief interest to the present invention are broadband microwave communications systems, such as local multipoint distribution services (LMDS). Now available in the United States and in other countries, LMDS provides fast, flexible and economical broadband wireless connectivity, with line of sight coverage over a distance range of about 3 to 5 kilometers. Schematically, LMDS systems may employ cellular-like designs to provide transport services over a much broader coverage area using functional partitions.

Typical LMDS equipment consists of both a hub and a subscriber unit. Similar to the deployment of a cellular telephone system or wireless local area network (LAN), the hub is deployed at a central site, and is responsible for coupling signals to one or more subscriber units. The subscriber units are located within radio range of the hub. Both types of LMDS equipment include a radio transmitter and receiver, a frequency converter, and a modem interface. The radio transmitter and receiver allow for transmission and reception of LMDS signals at the proper carrier frequencies in the microwave band. The modem interface provides signaling in a format expected by various wire line transport media. For example, cable modem type signaling may be used to interconnect the LMDS equipment to a computer network using coaxial cables. The frequency converter serves to shift the carrier frequency between the microwave carriers used for the over-the-air signals and the much lower carrier frequencies used for the over-the-cable signals.

Within certain countries, such as the United States and Canada, government authorities have allocated multiple microwave frequency blocks for LMDS service. These frequency blocks generally occupy up to 1 GHz bandwidth for the downstream channel and several hundred megahertz (MHz) of bandwidth for upstream channels. These bands generally lie somewhere within the range of from approximately 24 GHz to 32 GHz, depending upon the country. Depending upon the specific details of frequency allocations for upstream and downstream channels, the design of the solid state circuits can therefore present certain challenges. These requirements must be observed together with the requirement that the transmitter must maintain low phase noise to allow the use of common digital modulation schemes, and receiver amplifiers must have a relatively low noise figure. Furthermore, because LMDS must compete in the marketplace with other signal transmission schemes, such as coaxial cable and fiber, the equipment must be designed for small size and low manufacturing cost relative to what has been typical for 30 GHz radio equipment in the past.

Because LMDS is a duplex system, the subscriber unit typically includes an integrated up-converter circuit and a down-converter circuit. The up-converter shifts the carrier frequency of the modem signals from a baseband or intermediate frequency (IF) up to the microwave frequency carriers needed to propagate LMDS signals over the air. The down-converter performs the inverse function, converting the microwave frequency carriers at which the LMDS signals are received, to an IF appropriate for cable modem signalling. While the up-and down-conversion process can be generally be performed in a single frequency conversion stage in LMDS radios, the percentage difference between some of the frequencies in the conversion process is sometimes small, depending upon the band plan allocated for LMDS service. This ends up dictating the need for narrowband filters which must generally be realized as waveguide cavity bandpass filters. This type of filter represents large size, high cost and, depending on the precise frequency band plan, its loss can become significant when very narrow bandwidths are required.

There would be an advantage if the waveguide filter could be replaced or eliminated entirely. However, the high-Q, narrowband characteristic of the waveguide filter cannot be practically duplicated in other circuit technologies. Therefore, multiple frequency conversion stages may be needed if the waveguide filter is eliminated. Microstrip circuitry realized on modem low-loss microwave substrates can be utilized. While a microstrip circuit approach would add the complexity of additional frequency conversion stages, it would have a cost and size advantage over circuits employing waveguide.

Another cost driver is the low-phase noise local oscillator. Phase Locked Dielectric Resonator Oscillators (PLDRO's) provide excellent phase noise but are relatively high cost and not suitable for integration directly on the planar microwave circuit. Phase Locked Coaxial Resonator Oscillators (PLCRO's) available up to about 3 GHz have relatively good phase noise performance, and are compatible for placement on low cost, compact planar microwave circuit structures.

A radio design which makes use of CRO's in place of DRO's would therefore offer significant advantages. However, the use of a lower frequency local oscillator requires careful planning of how the multiple frequency conversion stages are implemented. For example, there is still a design tradeoff to be made in selecting the optimum number of stages, and the exact frequencies of the local oscillators (LOs) used in each stage. If the difference between the frequency of an LO and the required RF signals is small, fewer stages are needed. This has the benefit of reduced complexity, but requires a higher Q, narrower bandwidth bandpass filter. However, if the difference between the effective LO frequency and the RF signal is larger, although more stages may be needed, lower Q filters can be employed.

SUMMARY OF THE INVENTION

The present invention is a radio for use in microwave data link applications in which a common local oscillator signal is used for both a final up-converter stage and an initial down-converter stage. The frequency of the common local oscillator is also chosen to correspond to an integer multiple of a needed local oscillator frequency for an earlier up-converter stage or a later down-converter stage. The required carrier frequency for the other leg, that is, namely, the corresponding down-converter or up-converter carrier, can then be provided by a local oscillator circuit that provides a multiplication factor needed to separate the up and downstream bands with a sufficient guard band at the cable side. This frequency converter design allows an all microstrip implementation and does not require high Q filters which would otherwise necessitate using waveguide components.

One embodiment is adapted for use with cable modem signals and provides IF signals at 400–700 MHz in the upstream direction and from 1250–1950 MHz in a downstream direction. In this embodiment, a reference oscillator is selected having a suitable output frequency, such as in the range of 2.695 GHz. Phase Locked Coaxial Resonator Oscillators ((PLCROs) are widely available at such frequencies. The output of the reference oscillator is first fed to a times two (×2) frequency multiplier to provide a 5.39 GHz local oscillator (LO) signal. This 5.39 GHz signal is then used as an initial local oscillator signal for a first up-converter stage that provides an output at a first stage intermediate frequency (IF) in the range of from 5.79–6.09 GHz. This 5.39 GHz initial LO signal frequency is then multiplied by a pair of cascaded frequency doublers, to provide a 21.56 GHz local oscillator signal. This 21.56 GHz LO signal is then fed to a second mixer stage to shift the resulting output up to the desired 27 GHz LMDS band.

In the downstream direction, the same second stage LO of 21.56 GHz is used by an initial down-converter stage by a first mixer to provide a first down-converted IF in a 6.09–6.79 GHz range. The 21.56 GHz LO signal is thus used as a common local oscillator signal for both the final up-converter stage and first down-converter stage. A second reference oscillator, such as a 2.42 GHz, is fed to a frequency doubler to provide a necessary second stage local oscillator (LO) frequency of 4.84 GHz. This 4.84 GHz LO is then used to down convert to the desired output carrier to an output IF range of 1250–1950 MHz.

In an alternate embodiment, the multiple up-converted local oscillator signal can be used in the receive direction with direct synthesis on the transmit link.

This times two (×2) plus times eight (×8) frequency multiplication architecture permits a local oscillator signal, such as output from a Phase Locked Coaxial Resonator Oscillator (PLCRO), to generate all of the required local oscillator signals necessary for LMDS operation in an approximately 30 GHz band.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
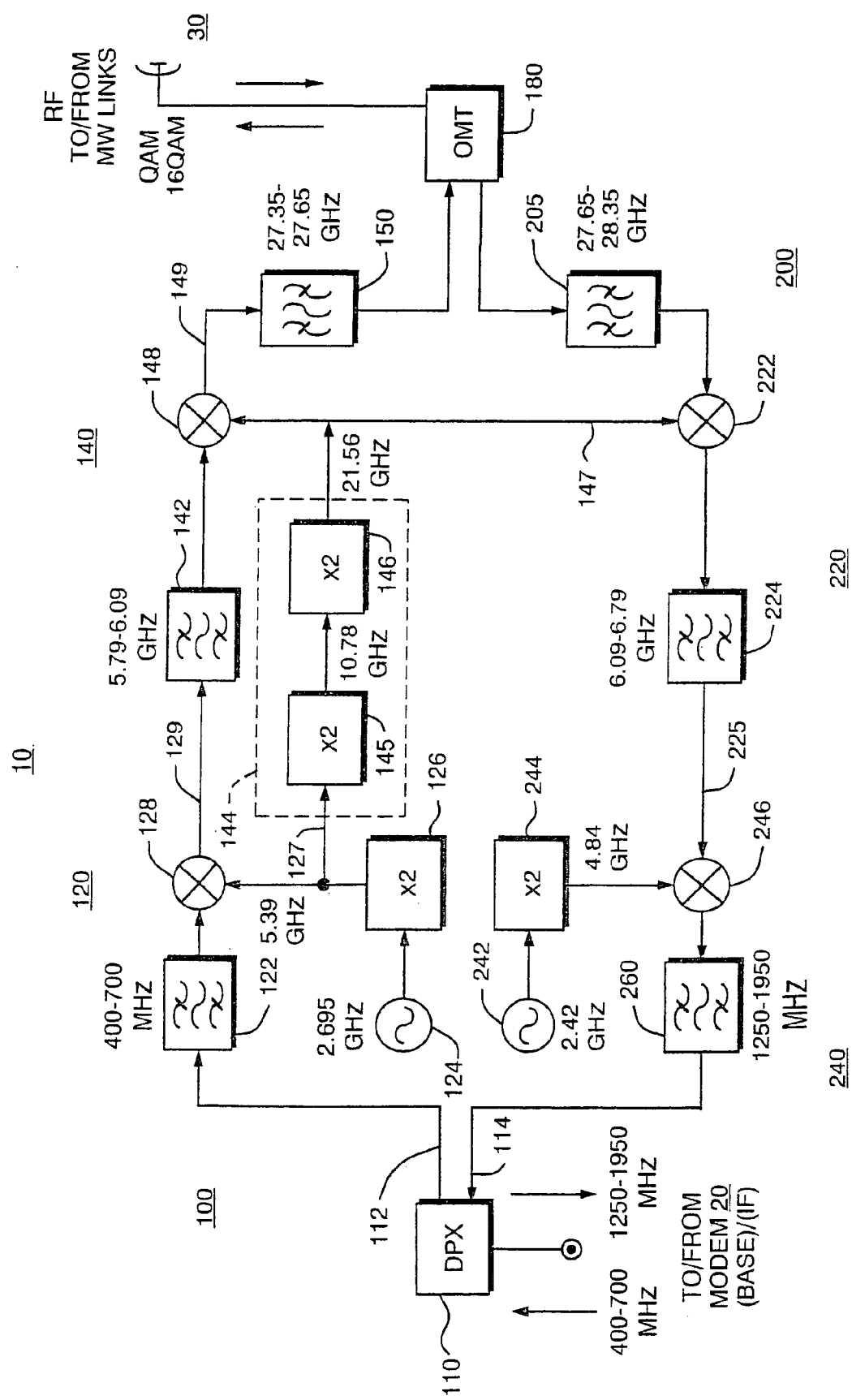
FIG. 1 is a block diagram of a radio transmitter and receiver which employs frequency up-converter and down-converter according to the invention.

Turning attention now to FIG. 1, there is shown a radio transceiver 10 for coupling data signals between a modem 20 (not shown) and microwave frequency radio signals coupled to an antenna 30. The transceiver 10 includes a frequency converter having a transmit leg, or up-converter 100, and a receive leg, or down-converter 200. The up-converter 100 receives baseband or intermediate frequency (IF) signals from the modem 20 and provides radio frequency (RF) signals in a microwave frequency band to the antenna 30. The down-converter 200 receives microwave signals from the antenna 30 and provides them to the modem 20 in baseband or IF form.

The modem 20 may be of various types. In the illustrated embodiment, the modem 20 is a cable modem which provides digital Quadrature Amplitude Modulation (QAM) or 16-QAM signals in a 400–700 MHz intermediate frequency (IF) range in an upstream direction. The cable modem receives signals in a 1250–1950 MHz IF range in a downlink direction. However, it should be understood that the modem 20 may also be another type of modem such as a 10 base T, or maybe even a telephone transport media interface such as a T1/E1, an asynchronous transfer mode (ATM), an optical carrier signal interfaces such as OC3, and/or other wired transport media interfaces.

On the microwave radio side, the signals coupled to and from the antenna 30 typically vary based upon the specific government radio licensing requirements in the geographic location of the equipment. In the illustrated embodiment, an upstream microwave frequency band has been allocated for LMDS service from 27.35–27.65 GHz. A contiguous downstream band is located from 27.65 GHz–28.35 GHz. It should be understood that other band plans, contiguous, overlapping, or separated and other service types such as MMDS can be accommodated by the transceiver 10 without departing from the spirit of the invention.

More particularly now, the up-converter 100 includes a duplexer 110, a first up-converter stage 120, a second up-converter stage 140, a transmit bandpass filter 150, and an ortho-mode transducer (OMT) 180.

The down-converter 200 consists of a receive bandpass filter 205, a first down-converter stage 220, a second down-converter stage 240, and portions of the duplexer 110.

The duplexer 110 splits signals associated with the up-converter 100 from those associated with the down-converter 200. More specifically, the duplexer 110 is in effect a pair of bandpass filters coupled to the modem 20. In the upstream direction, the duplexer filters signals in the 400–700 MHz range and provides them as an output signal 112 which is fed to the first up-converter stage 120. The duplexer 110 also contains a receive filter having a bandpass in the range of from 1250–1950 MHz. Signals provided from the second down-converter stage 240 are thus coupled to an RF receive input 114 of the duplexer 110.

The first up-converter stage 120 consists of a bandpass filter 122, reference oscillator 124, frequency doubler 126, and mixer 128. In operation, the output signal 112 provided by the duplexer 110 is fed to the bandpass filter 122. The output of the bandpass filter 122 is in turn fed to one input of the mixer 128. The other input of the mixer 128 is fed a local oscillator signal as generated from reference oscillator 124 and frequency doubler 126. In the illustrated embodiment, the first stage local oscillator signal 127 for this first up-converter stage 120 is a 5.39 GHz sinusoidal carrier signal. The output of the mixer 128 is thus a frequency up-shifted replica of the signal provided by the duplexer output 112, now shifted up to a 5.79–6.09 GHz band. The bandpass filter 142 limits the signal 129 generated by the first up-converter stage 120 to the indicated band of 5.79–6.09 GHz.

The output 129 of the first up-converter stage 120 is then fed to the second up-converter stage 140. This second up-converter stage 140 consists of a second bandpass filter 142, a frequency multiplier 144, a mixer 148, and an output filter 150.

In accordance with the invention, the frequency of the local oscillator for the second stage up-converter 140 is an integer multiple of the frequency of the same reference oscillator 127 used in the first up-converter stage 120. In particular, the reference signal 127 generated by the frequency doubler 126 is fed to a frequency multiplier 144. The frequency multiplier 144 imparts an integral multiple frequency up-shift to the reference signal 127. In the illustrated embodiment, the 5.39 GHz reference signal 127 generated in the first up-converter stage 120 is multiplied by a factor of 2, and then again by a second factor of 2, to provide a second stage local oscillator signal 145 at a 21.56 GHz carrier frequency. This second stage local oscillator signal 145 is then fed to the mixer 148.

The output signal 149 from the mixer 148 in the second up-converter stage 140 is thus a replica of the signal output from the duplexer 110 but now shifted to a 27.35–27.65 GHz band. The output filter 150 provides final conditioning of the up-converted signal 149 prior to feeding it to the ortho-mode transducer 180 and then out to the antenna 30.

In the receive leg 200, the first down-converter stage 220 uses the very same, common, local oscillator signal 147 used as the final stage local oscillator signal for the final up-converter stage 140. In particular, the local oscillator signal 147 is fed to the mixer 148 in the final up-converter stage 140 as well as to the mixer 222 in the initial down-converter stage 220. This initial down-converter stage 220, including the mixer 222 and bandpass filter 224, shift the carrier frequency of the signals provided by the ortho-mode transducer 180 down to an intermediate frequency band (IF) of 6.09–6.79 GHz. The IF signal 225 produced by the first down-converter stage 220 is then fed to the input of the second down-converter stage 240. A second down-converter stage 240, which consists of a reference oscillator 242, frequency doubler 244, mixer 246 and output filter 260, then shift the carrier frequency down by 4.84 GHz, resulting in an output signal 114 in a range of from 1250–1950 MHz, to provide a guard band over the cable from 700 to 1250 MHz. This output signal 114 is then fed to the input port of the duplexer 110 as previously mentioned.

It can now be understood how in accordance with the invention, the same local oscillator signal 147 is used on the final up-converter stage 140 and first down-converter stage 220. In addition, this local oscillator signal 147 is chosen to be an integral multiple of the first up-converter stage 120 local oscillator signal 127. The inventors have found that this in turn has a special advantage in situations where the upstream band is adjacent to the downstream band used on the microwave links. This design also introduces as little additional phase noise as possible into the up-converter process, and eliminates the need to have more than two up-converter stages. For the particular frequencies illustrated in the preferred embodiment, there is a net ten times up-converter, from a 2.8 GHz to a 28 GHz band, permitting the use of CROs that have sufficiently low phase noise to support QAM and other digital modulation.

In fact, the two times up-converter provided in the first up-converter stage 120 and final down-converter stage 240 do not contribute much to the overall phase noise.

Figure 2:
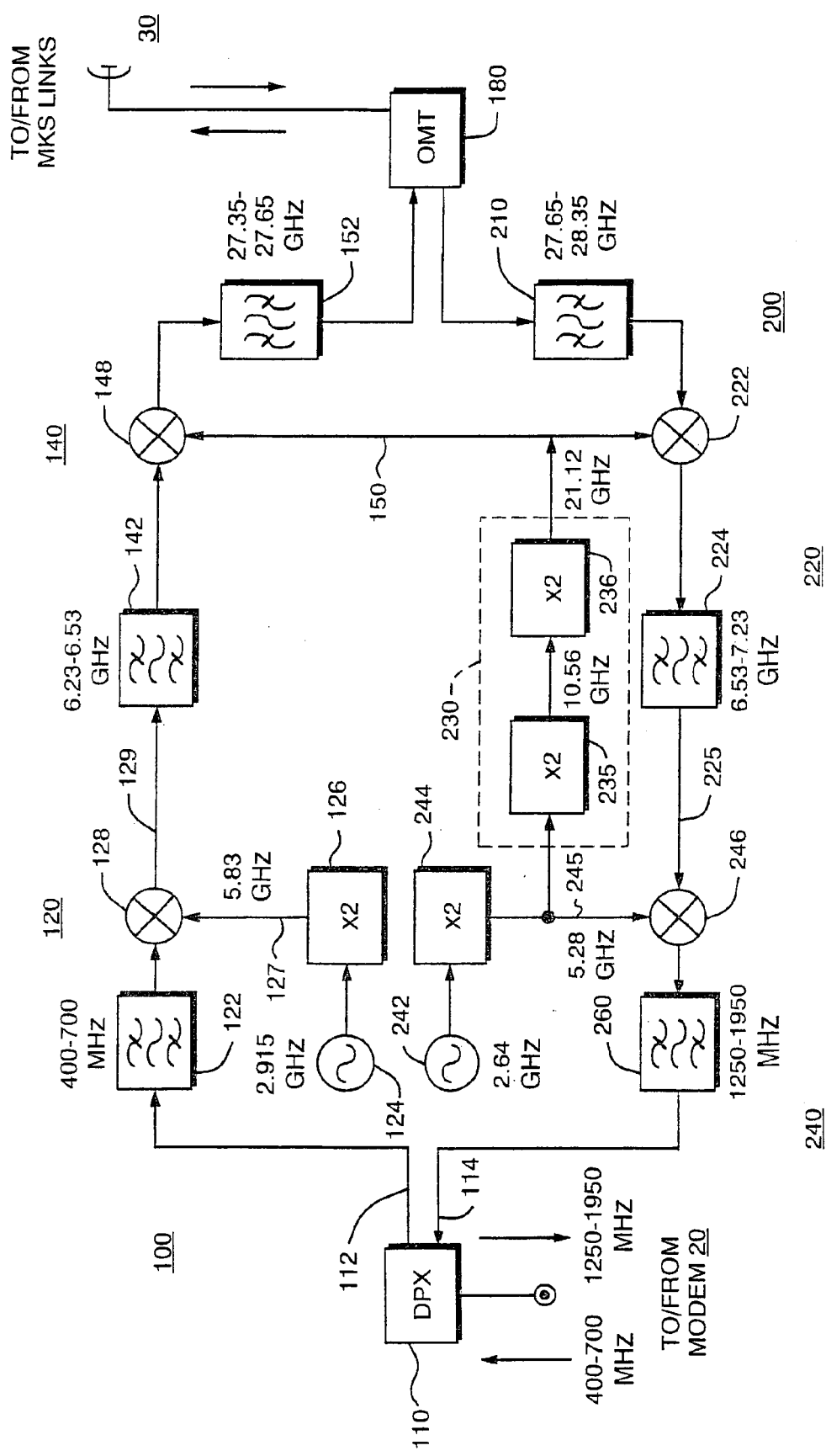
FIG. 2 is a block diagram of an alternative embodiment of radio transmitter and receiver according to the invention.

An alternate embodiment making use of the same principles of the invention is shown in FIG. 2. This embodiment provides the same functionality as the embodiment of FIG. 1. In particular, upstream signals are converted from a 400–700 MHz band to a 27.35–27.65 GHz band at the antenna 30, and downstream signals in a 27.65–28.35 GHz band are down-converted to a 1250–1950 MHz band at the modem 20. In this embodiment, the frequency multipliers are instead employed in the down-converter stage 200.

More particularly, in the up-converter 100, there is again a duplexer 110, and a first up-converter stage 120 consisting of a bandpass filter 122, reference oscillator 124, frequency doubler 126 and mixer 128. As before, the output 129 from the first up-converter stage 120 is fed to the IF filter 142, and then to the second up-converter stage 140. However, in this implementation, the local oscillator signal 150 needed for the second or final up-converter stage 140 is instead generated by the first down-converter stage 220. Specifically, note that the local reference oscillator 124 for the first up-converter stage 120 in this embodiment is at 2.915 GHz. The frequency doubled output is thus a 5.83 GHz local oscillator signal 127. This is in turn used to shift the output of the first up-converter stage 120 to a 6.23–6.53 GHz band. The local oscillator signal 150 thus provided from the first down-converter stage 220 is at a frequency of 21.12 GHz to provide the desired 27.35–27.65 GHz output for the up-converter 100.

Turning attention to the down-converter 200 more particularly, a reference oscillator 242 at 2.64 GHz is fed to a frequency doubler 244 to provide a final stage local oscillator signal 245. However, this final stage local oscillator signal 245 is also used by a frequency multiplier 230 to provide the local oscillator signal 150 for the first down-converter stage 220. In particular, the 2.64 GHz signal generated by the reference oscillator 242 after having been doubled in frequency to 5.28 GHz, is then quadrupled in frequency to provide a 21.12 GHz local oscillator signal 150. This local oscillator signal 150 is then used by the mixer 222 in the first down-converter stage 220 to provide a signal of interest in the 6.53–7.23 GHz band. The IF filter 224 limits the output of the mixer 222 to the band of interest before forwarding the mixer output signal 225 to the second down-converter stage 240.

The mixer 246 accepts the IF down-converted signal 225 and the local oscillator signal 245 further shifting the signal to the desired 1250–1950 MHz range. The output filter 260 further limits the signals to the desired bandwidth prior to forwarding and to the duplexer 110.

As with the embodiment of FIG. 1, a reference oscillator 242 is multiplied in frequency to provide a first local oscillator signal, this time being used for the second down-converter stage 240 and wherein the first reference oscillator signal is multiplied in frequency to provide a local oscillator not only for the first down-converter stage 220 but also for the final up-converter stage 140.

The invention thus provides several advantages over the prior art. For one, the local oscillator signals 124, 242 in FIGS. 1 and 2 can be generated using inexpensive Phase Locked Coaxial Resonator Oscillators (PLCRO's) which are commercially available at frequencies of up to about 3 GHz. The frequency conversion circuit used in the invention may therefore be used to generate LMDS radio signals in the 30 GHz band, using planner microstrip techniques, and without using waveguide-type components or interconnect technologies. The resulting radio equipment is therefore much more compact and less expensive to produce as a result. Furthermore, through use of the common reference oscillator 127 or 245, lower phase noise is experienced in the receive leg.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for microwave radio frequency communication wherein an upstream radio frequency (RF) band is used for transmitting signals in an upstream direction, and a downstream radio frequency band is used for receiving signals in a downstream direction, the apparatus comprising:
   an up-converter comprising at least two up-converter stages, each up-converter stage including a mixer, and each mixer accepting a respective local oscillator signal wherein a final up-converter stage is connected to provide a transmit RF upstream signal;
   a down-converter, comprising at least two down-converter stages, each down-converter stage including a mixer and accepting a respective local oscillator signal wherein a first down-converter stage is connected to receive a receive RF downstream signal;
   the mixers in the first down-converter stage and the final up-converter stage being connected to receive a common local oscillator signal;
   a local reference oscillator, for providing a local reference signal;
   a first frequency multiplier circuit, connected to receive the local reference signal, and to provide the common local oscillator signal at a frequency which is an integer multiple of the local reference signal;
   wherein the local reference signal is also to derive the local oscillator signal coupled to one of the mixers in a down-converter stage which is not the first down-converter stage, or the local reference signal is used to derive the local oscillator signal coupled to one of the mixers in an up-converter stage which is not the final up-converter stage; and
   wherein the local reference signal is fed to a second frequency-multiplier circuit to provide the local oscillator signal coupled to the mixer in the final down-converter stage.

2. An apparatus as in claim 1 wherein the multiplication factor of the second frequency multiplier circuit is four.

3. An apparatus as in claim 1 wherein the down-converter stages shift a carrier frequency of the microwave RF downstream signal by a factor of 10 times the local reference.

4. An apparatus as in claim 1 wherein the up-converter shifts a carrier frequency of the microwave RF upstream signal by a factor of 10 times the local reference.

5. An apparatus as in claim 1 wherein the first frequency multiplier circuit includes a series pair of frequency doubler circuits.

6. An apparatus as in claim 1 additionally comprising:
   a second reference local oscillator, coupled to provide the local oscillator signal to one of the mixers in an up-converter stage which is not the final up-converter stage, or coupled to provide the local oscillator signal to the mixer in a down-converter stage which is not the first down-converter stage, the frequency of the second local reference oscillator being selected to separate the upstream and modem downstream signals by a desired guard band.

7. An apparatus as in claim 1 wherein an upstream RF band and a downstream RF band are contiguous in frequency.

8. An apparatus as in claim 1 wherein an upstream RF band and a downstream RF band are separated in frequency.

9. An apparatus as in claim 1 wherein the transmit RF upstream signal and the receive RF downstream signal are coupled to an antenna.

10. An apparatus as in claim 9 wherein an ortho mode transducer (OMT) couples the transmit RF upstream and receive RF downstream signals to the antenna.

11. An apparatus as in claim 1 additionally comprising
   a modem, for coupling a modem upstream signal to the first up-converter stage, and for coupling a modem downstream signal to a final downconverter stage.

12. An apparatus for microwave radio frequency communications comprising:
   a duplexer, coupled to a cable to receive a digitally modulated upstream signal from, and to provide a digitally modulated downstream signal to the cable, the upstream signal containing information in a cable modem upstream frequency band, and the downstream signal containing information in a cable modem downstream frequency band;
   a first up-converter stage, coupled to receive the upstream signal from the duplexer and to receive a first intermediate frequency (IF) reference signal, the first up-converter stage additionally including a local reference oscillator, a frequency doubler, and a mixer, the frequency doubler connected to receive an output of the local reference oscillator and to provide the first IF reference signal, and the mixer for combining the first IF reference signal and the upstream signal from the duplexer;
   a second up-converter stage, coupled to receive the output of the first up-converter stage, the second up-converter stage including a mixer also receiving a second IF reference signal, the second IF reference signal derived from the first IF reference signal used in the first up-converter stage, but being first processed through a pair of cascaded frequency doubler circuits, the second up-converter stage thus providing an output up-converted signal;
   a transducer coupled to receive the output of the second up-converter stage, and to provide an up-converted signal to a microwave antenna, and also coupled to receive a signal from the microwave antenna, and to provide it to at a transducer output port;
   a first down-converter stage, coupled to receive the signal from the transducer output port in a first microwave RF range, the first down-converter stage having a mixer which uses a reference signal which is the same second IF reference signal used by the mixer of the second up-converter stage; and
   a second down-converter stage coupled to receive the output of the first down-converter stage, the second down-converter stage also including a mixer connected to receive a third IF reference signal and to provide a downconverted output signal in a cable modem downstream band, and to couple the downconverted signal to an input port of the duplexer.

13. An apparatus for microwave radio frequency communications comprising:
   a duplexer coupled to a wired physical transport media to receive an upstream signal from and to provide a downstream signal to the physical media, the upstream signal containing information in a cable modem upstream frequency band, and the downstream signal containing information in a cable modem downstream frequency band;
   a first up-converter stage, coupled to receive the upstream signal from the duplexer, the first up-converter stage including a mixer that receives a first intermediate frequency (IF) reference signal and provides a first up-converter stage output signal;

a second up-converter stage, the second up-converter stage containing a mixer which receives the output of the first up-converter stage and a second IF reference signal, and provides a second up-converter output signal;

an ortho-mode transducer connected to receive the up-converter output signal, and to couple it to a microwave radio antenna, the ortho-mode transducer also connected to receive a signal from the microwave antenna and to provide it at an ortho-mode transducer output port;

a first downcoverter stage, connected to receive the signal from the ortho-mode transducer output port, the first down-converter stage comprises a mixer, accepting as input the second IF reference signal;

a second down-converter stage comprising a mixer and a local reference oscillator, the local reference oscillator connected to a frequency doubler to provide a third IF reference signal to the mixer in the second down-converter stage;

a pair of cascaded frequency doublers, connected to receive the third IF reference signal and to output the second IF reference signal for the first down-converter stage and the second up-converter stage; and whereby the output of the second down-converter stage is connected to an input of the duplexer to provide the downstream signal in a cable modem downstream frequency band.

* * * * *